United States Patent [19]

Cattanach et al.

[11] Patent Number: 4,997,615

[45] Date of Patent: * Mar. 5, 1991

[54] METHOD OF PRODUCING SHAPED ARTICLES FROM REINFORCED COMPOSITES

[75] Inventors: James B. Cattanach, Middlesbrough; Eric Nield, Beaconsfield, both of England

[73] Assignee: Imperial Chemical Industries plc, London, England

[ * ] Notice: The portion of the term of this patent subsequent to Sep. 13, 2005 has been disclaimed.

[21] Appl. No.: 168,572

[22] Filed: Mar. 7, 1988

Related U.S. Application Data

[63] Continuation of Ser. No. 838,933, Mar. 12, 1986, abandoned.

[30] Foreign Application Priority Data

Mar. 21, 1985 [GB] United Kingdom ................ 8507312

[51] Int. Cl.$^5$ ............................................. B29C 43/02
[52] U.S. Cl. .................................... 264/510; 264/512
[58] Field of Search ................ 264/510, 512; 156/286, 156/308.2, 242

[56] References Cited

U.S. PATENT DOCUMENTS

| | | | |
|---|---|---|---|
| 2,978,376 | 4/1961 | Hulse | 264/510 |
| 3,042,574 | 7/1962 | Hochberg | 156/286 |
| 3,140,325 | 7/1964 | Gräaff | 264/510 |
| 4,478,771 | 10/1984 | Schreiber | 264/257 |

FOREIGN PATENT DOCUMENTS 1143646  3/1983  Canada .

*Primary Examiner*—Jill L. Heitbrink
*Attorney, Agent, or Firm*—Cushman, Darby & Cushman

[57] ABSTRACT

A method of shaping a body of thermoformable material containing continuous filaments by selecting a thermoplastic polymeric material having a minimum forming temperature which is no less than, and is preferably greater than the minimum temperature at which the thermoformable material of the reinforced body can be formed, contacting at least one surface of the reinforced body with the thermoplastic material, heating the reinforced body and a body of the thermoplastic material to a temperature at which the thermoplastic can be formed and applying a differential pressure preferably of not greater than 10 atmospheres, between opposite sides of the assembly of thermoplastic body and thermoformable body to induce a desired shaping of the reinforced thermoformable body and cause rearrangement of the filaments relative to each other, and adhering the thermoplastic body to the thermoformable body.

4 Claims, No Drawings

METHOD OF PRODUCING SHAPED ARTICLES FROM REINFORCED COMPOSITES

This is a continuation of application Ser. No. 838,933, filed Mar. 12, 1986, which was abandoned upon the filing hereof.

This invention relates to a method of producing shaped articles containing fibrous reinforcement from reinforced composite materials, particularly those composites in which the fibers are continuous, collimated fibers.

Methods of impregnating continuous fibers with thermoplastics have recently been devised which enable the exceptionally high physical properties of reinforcing fibers, such as glass or carbon fibers to be fully utilised in composites of continuous fibers. Such composite products having continuous, collimated fibers can be produced as continuous profiles by appropriate profiling of the impregnated product but are generally produced as flat tapes or sheets, known as pre-preg, which are subsequently laid up and consolidated into flat structures having multi-directional reinforcement, to provide quasi-isotropic reinforcement in the plane of the structure. Such consolidated structures have exceptional strength and stiffness but by the nature of the continuous fiber reinforcement are difficult to fabricate into shaped articles in processes in which the structure requires to be subjected to any elongation process. European Patent Publication No. 0 155 820 provides an exceptionally effective method of forming such composites in which fluid pressure is applied to a diaphragm of plastically deformable metal to urge a body of composite into a required shape. Preferably the metal is a superplastically deformable metal. Although alloys are commercially available which are suitable for shaping composites in which the matrix polymers has a thermoformable temperature in excess of 300° C., metals for forming composites in which the matrix has a thermoformable temperature of less than 300° C. are not readily available. In addition, the metal diaphragms are normally thrown away as scrap after the operation, adding to the cost of shaping.

A method has now been devised of shaping thermoformable composites, particularly those containing continuous collimated fibers, without the need to employ metal diaphragms.

According to the invention there is provided a method of shaping a body of thermoformable material containing continuous filaments comprising selecting a thermoplastic polymeric material having a minimum forming temperature which is no less than, and is preferably greater than the minimum temperature at which the thermoformable material of the reinforced body can be formed, contacting at least one surface of the reinforced body with the thermoplastic material, heating the reinforced body and a body of the thermoplastic material to a temperature at which the thermoplastic can be formed and applying a differential pressure, preferably of not greater than 10 atmospheres, between opposite sides of the assembly of thermoplastic body and thermoformable body to induce a desired shaping of the reinforced thermoformable body and cause rearrangement of the filaments relative to each other, and adhering the thermoplastic body to the thermoformable body.

Whilst the reinforced thermoformable body will normally be of a reinforced thermoplastic polymer body wherein the thermoplastic of the body will have a forming temperature no higher than the thermoplastic body which is urged against it to produce the shaping (hereinafter termed "the thermoplastic polymer shaping body") the invention also includes the use of reinforced thermosettable materials which can be shaped whilst in a flowable condition and subsequently cured.

The thermoplastic polymer shaping body will normally have a minimum forming temperature above that of the reinforced thermoformable body so that the resistance to deformation at a given temperature in the process of shaping the assembly of shaping body and reinforced body is dominated by the thermoplastic polymer shaping body, but this requirement can also be achieved if the two polymers have the same minimum forming temperature. For example, if the thermoplastic polymer shaping body is of the same polymer type as that of the thermoformable reinforced body but is of higher molecular weight or is thicker than the reinforced, thermoformable polymer body then the higher molecular weight or thicker shaping body can be used to dominate the process and control the shaping.

The minimum forming temperature of a thermoplastic polymer is the temperature at which it can be uniformly stretched by at least 20%. In general such a temperature will be at least 20° C. above the glass transition temperature of the polymer and below the decomposition temperature.

When the polymeric materials of the thermoformable polymer and the shaping polymer are amorphous polymers the glass transition temperature of the shaping polymer should preferably be higher than that of the thermoformable polymer and the shaping operation should be carried out above the Tg of the shaping polymer. If both materials are crystalline the shaping operation should preferably be carried out at a temperature above the melting point of the shaping polymer and the thermoformable polymer should have a melting point lower than that of the shaping polymer.

A major advantage of the invention compared with processes such as hydroforming is that much lower pressures, for example differential pressure of less than 10 atmospheres and desirably less than 1 atmosphere can be employed. This enables the moulding apparatus employed to be not only cheaper but to be operable at considerably greater size to produce larger area mouldings than previously.

Whilst it is preferred that the continuous fibers are present in the reinforced thermoformable body as continuous collimated fibers, preferably extending the width and length of the body to be shaped, the invention includes the use of random fiber reinforced bodies having randomly disposed fibers providing they are at least 20 mm long. Surprisingly, the invention gives the best results with continuous, collimated fibers extending through the dimensions of the body despite the fact that the extensibility of such products is inherently limited. The invention is also useful in the forming of shaped articles in a process in which a plurality of superimposed layers of parallel, collimated, continuous filaments in a thermoplastic matrix, in which the continuous filaments have been severed in predetermined positions, are present and which increase the extent to which the layers can be formed into a shaped article. The position of the cuts in the continuous filaments are predetermined so that on shaping, resulting in slippage of the layers of filaments, discontinuities in the filaments occur in regions of the article which are reinforced with adjacent continuous fibers and that there is no overlap of adjacent discontinuous regions. The process of forming articles from prepregs having predetermined severance lines is described in EP 155,820.

Conventional techniques, such as using matched metal moulds or stamping processes are not useful for forming such continuous fiber composites because they cause extensive buckling of the fibers because it is not possible to conveniently redistribute and accommodate the fibers in the shaped moulding.

In one embodiment of the invention shaping of the reinforced thermoformable body is achieved whilst it is contained within a sandwich of two sheets of thermoplastic polymer material, the forming being carried out at or above the minimum forming temperature of the thermoplastic material of the sheets. Fluid pressure is applied to the sandwich to produce the required shaping, optionally with the assistance of a mould surface against which the sandwich is urged. The thermoplastic polymeric material used to manipulate the thermoformable body into the desired shape is integral with the reinforced body in the final shaped article produced. Although this may be achieved by using a suitable adhesive, such as a melt adhesive, it is preferred that the nature of the thermoplastic shaping body should be chosen to be compatible with the polymer of the thermoformable body so that an intimate bond between the two bodies results when they are brought together under the conditions of the process. Some typically suitable combinations of shaping body polymer and polymer of the reinforced body are respectively poly(methyl methacrylate) and poly(vinyl chloride), polyethersulphones and polyetherketones, and combinations where the polymers are chemically similar but differ in molecular weight, the polymer of the reinforced body being lower in molecular weight. As indicated above some control of the process may also be achieved by using a shaping body which is thicker than the reinforced body.

When the thermoformable reinforced body to be shaped has a thermoplastics polymer matrix the preferred reinforced body is one in which care has been taken to ensure that the individual filaments making up the reinforcement have been substantially completely wetted by the thermoplastic polymer. In view of the fact that individual reinforcing filaments will usually have a filament diameter of between about 5 and 25 microns the task of wetting all such filaments in a body containing more than 20% by volume of such filaments is difficult when a molten thermoplastic is used because of the high melt viscosity of such materials. Suitable products have recently been developed and can be prepared by the processes described, for example, in European Patent Publication Nos. 56703 and 102 159. These publications disclose processes for the impregnation of rovings of reinforcing fibers and provide continuous lengths of unidirectionally reinforced material which can either be laid up to provide multidirectional reinforcement, to provide quasi-isotropic reinforcement, which is consolidated as a result of the forming operation of the invention or can be pre-consolidated into multidirectional reinforcement prior to use in the present invention.

The invention is of particular use for shaping thermoformable materials that are reinforced thermosettable materials which require to be cured at high temperatures. For example, high performance thermosetting polyimides, such as those supplied by Du Pont under the trade name 'Avamid' may be shaped to advantage according to the invention using high temperature performance thermoplastic films particularly films of polyetherketones, such as polyetheretherketone, supplied under the trade name 'Victrex' PEEK by Imperial Chemical Industries PLC. The final shaping should be provided with at least one film of PEEK adhered to the polyamide. The adhered film will provide the composite with excellent environmental resistance.

The assembly of reinforced thermoformable body and at least one thermoplastics body for manipulating the thermoformable body into the desired shape may be laid up from separate components prior to the shaping operation or may be prebonded together before shaping.

A variety of shaping operations may be employed which may or may not use a mould surface to determine the shape produced. In general, an assembly of a thermoformable body and at least one thermoplastic shaping body is clamped about the periphery of the assembly and is shaped whilst at a temperature at which both bodies are formable For example, a thermoplastic shaping body in the form of a thermoplastic sheet can be used to urge a heat softened composite sheet into a female mould tool. The invention is particularly useful for forming shaped articles of nonuniform thickness which would be difficult or impossible to consolidate or to deform using rigid flat platens or matched moulds. The use of a plastically deformable metal sheet enables the sheet to conform with and be urged against the irregular surface of the body, the other surface being restrained by a rigid flat surface or a male or female mould surface.

When continuous, collimated fibers are present in the reinforced body it is preferable to form a sandwich from a pair of thermoplastic sheets with the reinforced body between the sheets, the sheets of the sandwich being larger than the reinforced body to be formed so that the sheets can be restrained by clamping about their mutual perimeters in a moulding operation whilst the reinforced body is unrestrained between the sheets and the edges of the composite are left free to move in the direction parallel to the sheets. Surprisingly, the thermoplastic sheets enable the continuous multi-directional reinforcement in the core of the sandwich to be reorganised whilst restraining the core and urging it into the required shape without significant buckling of the filaments occurring.

When a reinforcing body is contained between two thermoplastic shaping sheets it is possible to obtain useful shaped articles without the use of a mould surface by freely blowing or drawing a dome using pressure above and below atmospheric pressure respectively. When a mould is used it may be a female mould into which the heat softened assembly is urged, or a male mould over which the assembly is urged, by a differential pressure, preferably a fluid pressure acting on a shaping sheet.

When a pressure differential is applied to one side of the sandwich but not the other the sheet remote from the pressure application may be perforated to ensure that any gases trapped in the sandwich are released. Alternatively, the space between the two sheets can be evacuated to remove gases. In addition, if the vacuum between the two sheets is sustained whilst the sandwich is being deformed this will maintain a consolidating force upon the plastics/fiber composite additional to any consolidating force resulting from the stretching of the thermoplastic shaping sheets. After deformation the sandwich is allowed to cool so that the deformed composite body is "fixed" in shape.

When thermosettable materials are used as the thermoformable material provision should be made to permit escape of volatile materials during the curing process. This may be achieved by using a pair of thermoplastic shaping sheets in the forming process, one of which is perforated to allow the escape of volatile materials during the thermoforming process and subsequent forming in the shaping apparatus. Alternatively where the shaping of composite body and the attached thermoplastic film has sufficient form stability completion of the cure of shaping can be accomplished outside the mould with one surface of the thermoset composite exposed to allow escape of volatile materials.

Although fluid pressures, optionally transmitted through a resilient diaphragm are preferred for urging the assembly into the desired shape, because a uniform pressure is thereby transmitted over the surface of the shaping body other methods of shaping can be employed Thus, the fluid pressure can be supplemented by plug-assisted forming or the shaping may be effected entirely by matched moulding of two corresponding mould shapes.

The invention is now described with reference to the accompanying examples.

EXAMPLE 1

In this example a shaped article was produced having outer surfaces of high molecular weight polymethyl methacrylate (PMMA) and a core of glass reinforced polyvinyl chloride An assembly was made up of two discs of PMMA cast sheet of thickness 1.5 mm having a diameter of 18 cms, enclosing a disc of diameter 14 cms made up of woven tapes in a tabby weave pattern of glass reinforced PVC 2 cm wide and 0.1 mm thick prepared according to the general procedure of European patent publication No. 102 159. An adaptor ring was inserted between the two PMMA discs to coincide with the peripheries of the disc leaving the reinforced woven mat between the discs out of contact with the adaptor ring.

This assembly was placed between two oven halves having diameters coinciding with the adaptor ring and with provision for clamping The two oven halves together, the oven halves already being at set temperatures of 165° C. The adaptor ring was provided with a radially directed channel through the ring to which vacuum could be applied to evacuate the space between the two outer discs. After location between the oven halves and closing of the oven halves a vacuum of 74 cms of mercury was applied. After a period of 5 minutes to allow for equilibration a pressure differential of 0.2 bar was applied across the laminate using compressed air pressure applied through inlets in the end plates of the oven halves. After a further period of 7 minutes the oven was switched off and fan cooling was applied whilst the pressure was maintained during the assembly in the oven. The pressure was released after 54 minutes and the article removed from the oven. The vacuum applied to the assembly had caused it to contract to a flat laminate when the outer sheets became heat softened and the action of the differential pressure resulted in the formation of a freely blown dome with a depth of draw of 25 mm relative to an unrestrained disc diameter of 95 mm. In those areas of the laminate which had been stretched the continuous fibers had reorganised themselves by relative movement within the core to allow the deformation to take place without fiber breakage. The shaped laminate had an excellent surface area and by visual inspection was seen to be completely consolidated with completely wetted fibers.

EXAMPLE 2

The procedure of Example 1 was repeated using a core of a carbon fiber impregnated with a poly(methyl methacrylate) made according to Example 9 of European Patent Publication No. 102 159. In this example no differential pressure was applied across the laminate. A vacuum of 74 cm of mercury was applied for 3 minutes, after which the oven was switched off and cooling applied by the assistance of an external fan. After 28 minutes the laminate was removed from the oven. A flat laminate was produced in which the reinforced core was integrated with the PMMA skins.

We claim:

1. A method of shaping a body of reinforced thermoformable material comprising:
    (a) forming said body from prepregs of continuous, collimated filaments in a thermoplastic matrix, said prepregs being laid up to give multidirectional reinforcement which extends the length and the width of said body;
    (b) selecting a thermoplastic shaping material having a minimum forming temperature which is greater than the minimum temperature at which said thermoplastic material of said body can be formed;
    (c) supporting said body by containing it within the periphery of a pair of sheets of said thermoplastic shaping material;
    (d) restraining said sheets about their peripheries, said body being unrestrained between said sheets;
    (e) heating said body and said sheets to a temperature at which said thermoplastic shaping material can be formed; and
    (f) applying a differential pressure between opposite sides of the assembly of said thermoplastic shaping sheets and said body to induce a desired shaping of said body and cause rearrangement of said filaments relative to each other and to adhere at least one of said sheets to said body.

2. A method of shaping a body according to claim 1 wherein the differential pressure applied is a fluid pressure of less than 10 atmospheres.

3. A method of shaping a body according to claim 1 in which at least one sheet of thermoplastic material becomes integral with the reinforced body as a result of the conditions used in the method of shaping.

4. A method according to claims 1, 2 or 3 wherein the prepregs are strips of reinforced thermoplastic resin and are consolidated together before shaping.

* * * * *